United States Patent [19]

Legrand et al.

[11] 4,174,609
[45] Nov. 20, 1979

[54] LOCKING SYSTEM FOR SLIDING COWLINGS OF TURBOJET ENGINE NACELLES

[75] Inventors: Paul J. Legrand, Vaux le Penil; Henry Naud, Verrieres le Buisson, both of France

[73] Assignee: Societe Nationale d'Etude et de Construction de Moteurs d'Aviation, Paris, France

[21] Appl. No.: 875,916

[22] Filed: Feb. 7, 1978

[30] Foreign Application Priority Data

Feb. 8, 1977 [FR] France ............................ 77 04140

[51] Int. Cl.² ......................... F02C 7/20; E05C 5/00; E05C 19/12
[52] U.S. Cl. ................................... 60/262; 60/39.31; 74/96; 292/111; 403/230; 403/330
[58] Field of Search .................. 292/65, 66, 111, 113, 292/242; 244/129.4, 132, 54, 120; 60/226 R, 39.31, 39.32, 262; 74/96, 527; 403/230, 264, 322, 330

[56] References Cited

U.S. PATENT DOCUMENTS

| | | | |
|---|---|---|---|
| 359,274 | 3/1887 | Mix | 292/111 |
| 3,194,595 | 7/1965 | Wheeler et al. | 292/113 |
| 3,374,972 | 3/1968 | Webb | 244/137 R |
| 3,409,320 | 11/1968 | Eckerle | 292/66 |
| 3,494,641 | 2/1970 | Caregnato | 403/322 |
| 3,541,794 | 11/1970 | Johnston et al. | 60/39.31 |

FOREIGN PATENT DOCUMENTS

| | | | |
|---|---|---|---|
| 748806 | 4/1944 | Fed. Rep. of Germany | 74/96 |
| 1079841 | 12/1954 | France . | |
| 14365 | of 1909 | United Kingdom | 292/111 |
| 964917 | 7/1964 | United Kingdom | 403/343 |

*Primary Examiner*—Carlton R. Croyle
*Assistant Examiner*—Thomas I. Ross
*Attorney, Agent, or Firm*—Bacon & Thomas

[57] ABSTRACT

One component, such as a rear cowling of a turbojet engine nacelle, is held to another component, such as a flange of the engine housing, by a plurality of lockbolts. The lockbolts are synchronously controlled to effect attachment or detachment of the cowling or other component. Each lockbolt includes a strap which may be fixed with respect to the stationary component such as the flange. Each lockbolt also includes a tie bar having a hook at one end for cooperation with the associated strap and a pivot shaft at the other end. The pivot shaft rides in a slide track which may be disposed in a second support attached to the removable component. There is a moving part which may be carried by the second, stationary support, the moving part including a cam which cooperates with the pivot shaft of the tie bar to impart translational movement to the tie bar. The cam has a dwell portion which enables the moving part to move beyond the position at which the hook of the tie bar is fully withdrawn. This helps compensate for ay irregularities or differences in the locking of the various hooks. That is, the dwell of the cam takes up any slack. Once the locking operation is accomplished, the dwell of the cam also relieves stresses in the apparatus for synchronously operating the multiple locking bolts.

10 Claims, 6 Drawing Figures

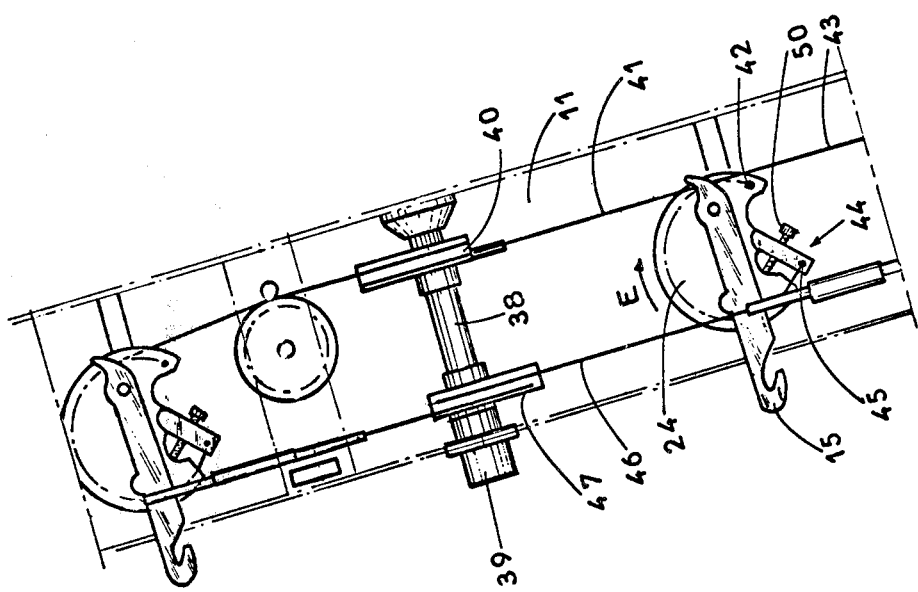

LOCKING SYSTEM FOR SLIDING COWLINGS OF TURBOJET ENGINE NACELLES

BACKGROUND

1. Field of the Invention

The invention relates to a rapid means of joining together two components as one so that relative motion in any direction is completely prevented. Although the invention may be applied to numerous situations where an effective joining is desired, it is particularly suitable for fastening together annular components, or cowlings, used in aircraft engine nacelles or pods, where the fastening must be not only reliable but also quickly executed.

2. Description of the Prior Art

For illustrative purposes, FIG. 1 shows a known type of turbojet by-pass engine. From upstream to downstream, referring to the direction of flow of gases shown by the arrow F1, such an engine schematically comprises a fan at 1 consisting of a low-pressure compressor which rotates within a first housing 2, one or more compressor stages at 3, a combustion chamber at 4, one or more turbine stages at 5 which drive the fan and the compressors, and an exhaust pipe at 6. The latter components are enclosed within a common cowling 7 which is made integral with the housing 2 of the fan. The operation of such an engine will not be described. It will merely be recalled that the fan 1 feeds air under pressure both to the compressor or compressors and around the cowling 7, the ratio of these two air flows being known as the motor dilution rate.

If it is to be installed on an airplane, the engine defined in this manner is enclosed in a nacelle which provides protection and channels the air. The engine suspension means are not a part of the invention and are not depicted. The nacelle comprises an air intake 8 which is an annular cowling connected at 9 to the upstream portion of the housing 2 of the fan 1, a two-part fan cowling 10 hinged, for instance, on the engine suspension device and affording access to various engine components, a rear cowling 11 which is also annular in shape and which is connected at 12 to the downstream portion of the housing 2 of the fan 1.

In the specific case chosen, the cowling 11 is mounted in a sliding fashion. That is, it is, for instance, installed so as to roll by means of roller wheels on tracks which are integral with the structure of the aircraft.

The air intake cowling 8 is generally made integral at 9 with the upstream portion of the fan housing 2 by means of a system of flanges secured by bolts. This arrangement is also generally used to join the rear cowling 11 at 12. The connection at 12 comprises, for example, a flange on the rear cowling which opposes a flange in the fan housing. Holes spaced at regular intervals on said flanges allow bolts to be inserted to effect the fastening; and means for centering and for angularly positioning the cowling 11 with respect to the flange of the housing 2 are provided, as well as means intended to absorb stresses exerted in the joining plane of the flanges and to prevent all relative movement in this plane. The latter may be the same as the former in certain cases. The bolts thus work solely in tension.

This traditional type of fastening by means of flanges and bolts is widely used by virtue of its simplicity of execution. Nevertheless, it requires a relatively long time for installation and removal of the cowling 11, due to the number of bolts and to the difficulty of access in large engines. Moreover, the fastening by means of bolts requires a certain number of precautions, in order to prevent premature opening as the result of vibrations, which also lead to a lengthening of the assembly and disassembly time.

SUMMARY

The fastening device according to the invention has the objective of permitting rapid joining and removing of such a cowling and remedying certain drawbacks of the flange-and-bolt fastening method.

The device according to the invention for rapidly securing two components is of the type in which the two components are provided with positioning means and with means preventing all movement in their joining plane. The device comprises means for hooking together and holding fast the contacting portions of the two components, which hooking and holding means are driven in a synchronous manner.

The means for hooking and holding fast, which also serve to transmit longitudinal stresses, include lockbolts spaced at regular intervals and synchronously controlled. Each lockbolt comprises an adjustable strap mounted on a support attached to the first component, such as a flange of the engine or fan housing; a driven tie bar, which terminates at one end in a hook which, in turn, acts in conjunction with the strap and which tie bar has at its other end a pivoting shaft capable of effecting a translatory movement within a slide guide of a support attached to the second component, such as the removable cowling; a means for driving the tie bar, the driving means consisting of a moving part with a stationary axle parallel to the pivoting axis of the tie bar and integral with the support joined to the second component, driven in rotation by a motor means and wherein there is provided a cam profile which works together with the pivoting shaft of the tie bar; return and holding means which impart an overall translatory motion to the tie bar, and means for disengaging the hook by turning aside the tie bar from its direction of translation at its fully extended position.

More specifically, the device for attaching the second component, such as a rear cowling of a turbine engine nacelle, onto a first component, such as a flange of the housing of the turbojet engine, comprises: means for centering and angularly positioning the cowling with respect to the flange; means for absorbing stresses acting in the direction of the joining plane of the flange and the cowling; means for holding the cowling tight against the flange and ensuring the transmission of longitudinal stresses between the flange and the cowling, the holding means comprising a plurality of circumferentially spaced lockbolts; and means for synchronously controlling the lockbolts. Each lockbolt comprises a first support on the flange; an adjustable strap mounted on the first support; a second support attached to the cowling; a driven tie bar; a hook on one end of the tie bar, the hook cooperating with the strap; a pivot shaft at the other end of the tie bar; a slide track in the second support, the pivot shaft cooperating with the slide track for translational movement therealong; means coupled with the tie bar for driving the same, the driving means including a moving part with a shaft having an axis fixed with respect to the cowling, the shaft of the moving part being parallel to the pivot shaft, the driving means being actuated by the controlling means; the moving part including a cam which cooperates with the pivot shaft of the tie bar, the cam having a first section of evolutional radius with respect to the axis of the moving part and a second section which transitions from the end of the largest radius of the preceding, first section and which has a constant radius with respect to the axis of the moving part. The holding means also includes means for disengaging the hook from the strap by pivoting the tie bar from its direction of translation at its fully extended position and take-up and holding means between the cowling and tie bar for restraining the tie bar to translational movement except when pivoted by the disengaging means.

This device for locking and transmitting longitudinal stresses will be described in greater detail with reference to a use of the invention for the securing in place the sliding cowling 11 of a turbojet engine nacelle.

BRIEF DESCRIPTION OF THE DRAWING

FIG. 6 schematically represents the drive mechanism of a group of lockbolts in the case where they are used to join together two annular components.

DETAILED DESCRIPTION

Figure 2:
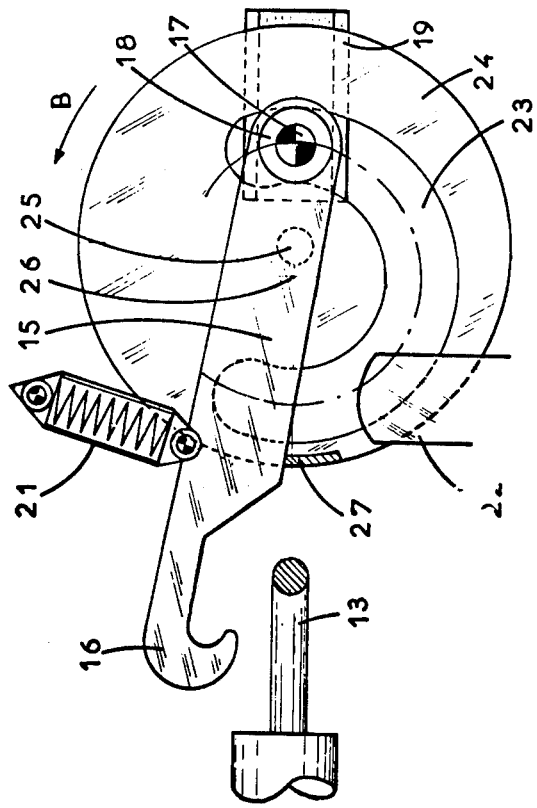
FIGS. 2 and 3 show schematically the constituent elements of the lockbolt according to the invention and show its operation.
Figure 4:
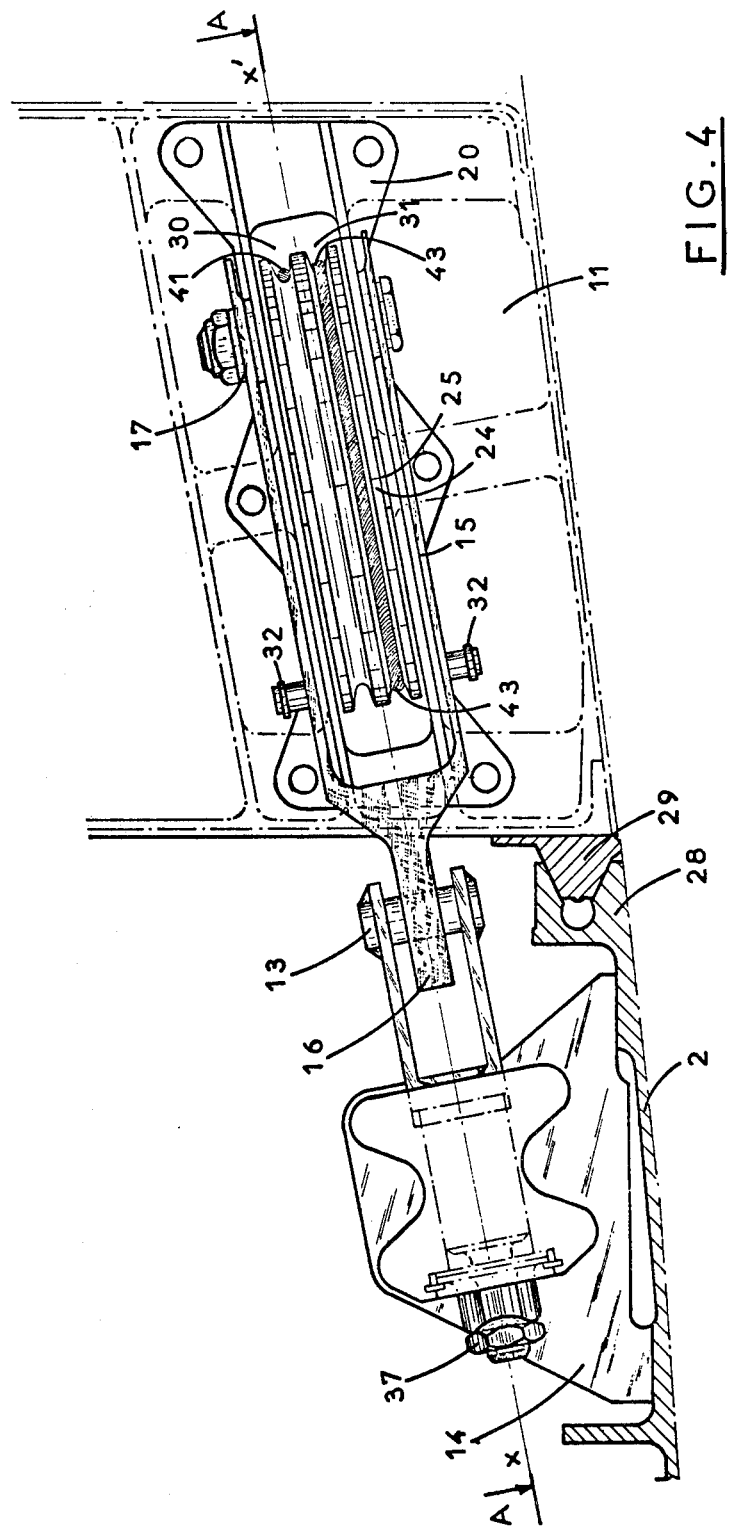
FIG. 4 shows a preferred embodiment of the lockbolt according to the invention.

In FIG. 2, the strap 13 is mounted on a support 14 which is integral with one of the components, such as the flange of the fan housing 2 (FIG. 4). The tie bar 15 is provided at one end with a hook 16 which cooperates with the strap 13. Its other end is provided with a pivot shaft 17 guided by means of a roller 18 within a straight slide track 19 which is integral with a support 20 joined to the second component, such as the sliding cowling 11 (FIG. 4). Furthermore, the tie bar is held in position by a spring 21, which works in compression, in conjunction with a thrust bearing 22 of the support 20. The translational movement of the roller 18 within the track 19 is controlled by a cam profile 23 traced in a moving part 24 whose rotation shaft 25 is stationary and integral with the support 20.

Figure 3:
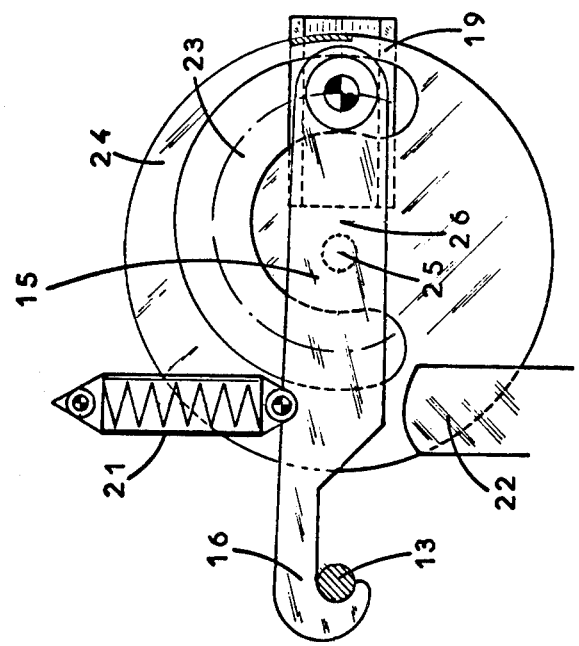

This cam profile 23 comprises a first, circular portion centered at 26 on the moving part 24 and extending over an angle corresponding to the length of the desired path of the hook. This circular portion thus moves eccentrically with respect to the motion of the moving part 24. The hook reaches its fully withdrawn position when the shaft 25, the axis 26 and the strap 13 are aligned, the shaft 25 then being between the axis 26 and the strap 13 (FIG. 3). From this position on, the cam profile has a circular portion centered on 25, permitting the cam to continue its movement without thereby moving the hook. This arrangement is particularly advantageous because the fact that the moving part continues to move beyond the position at which the hook is fully withdrawn ensures that the roller will be held in place on the dwell section thus defined. This dwell of the cam also makes it possible, when several rollers are driven synchronously, to take up the angular displacement of the moving parts with respect to each other and to permit the effective locking of all the hooks. The dwell has the further advantage of permitting the hooks to be held in position without keeping the control means under stress, thus relieving the control means once the locking is accomplished. The hook reaches its fully extended point at a position in which the axis 26 is aligned between the strap 13 and the rotation shaft 25 (FIG. 2). In this position, the hook is turned aside from its locking position by a thrust bearing 27 which acts against the take-up means.

The system thus functions as follows: In the open position (FIG. 2), the hook is disengaged from the strap. This is made possible by the action of the thrust bearing 27 which belongs to the moving part 24 and acts against the take-up means which comprises the spring 21 working in compression. Once the two components, for instance, the cowling 11 and the housing 2, have been brought together, the cam is activated in the direction of arrow B by a driving means, which may be a cable, a jack, etc. This movement of the cam simultaneously entails the translation toward the right of the roller 18 and the take-up of the tie bar 15 toward its thrust block 22, but first the hook 16 will come into contact with the strap 13. The continuation of the movement of the cam makes it possible for the hook to engage the strap and gradually hold it tighter. Once it arrives at the maximum locking point, that is, at the fully withdrawn position of the hook, the roller engages within the dwell portion of the cam, which may then continue its movement without affecting the position of the hook. The hook opening and disengaging movement is accomplished by means of a rotation of the cam in the opposite direction. The path of the hook determines the length of the slide track 19 provided in the support 20. In any event, the movement of the cam cannot extend beyond the point where it abuts against the roller 18, should there be a breakdown in the stopping system provided on the drive means.

Figure 1:
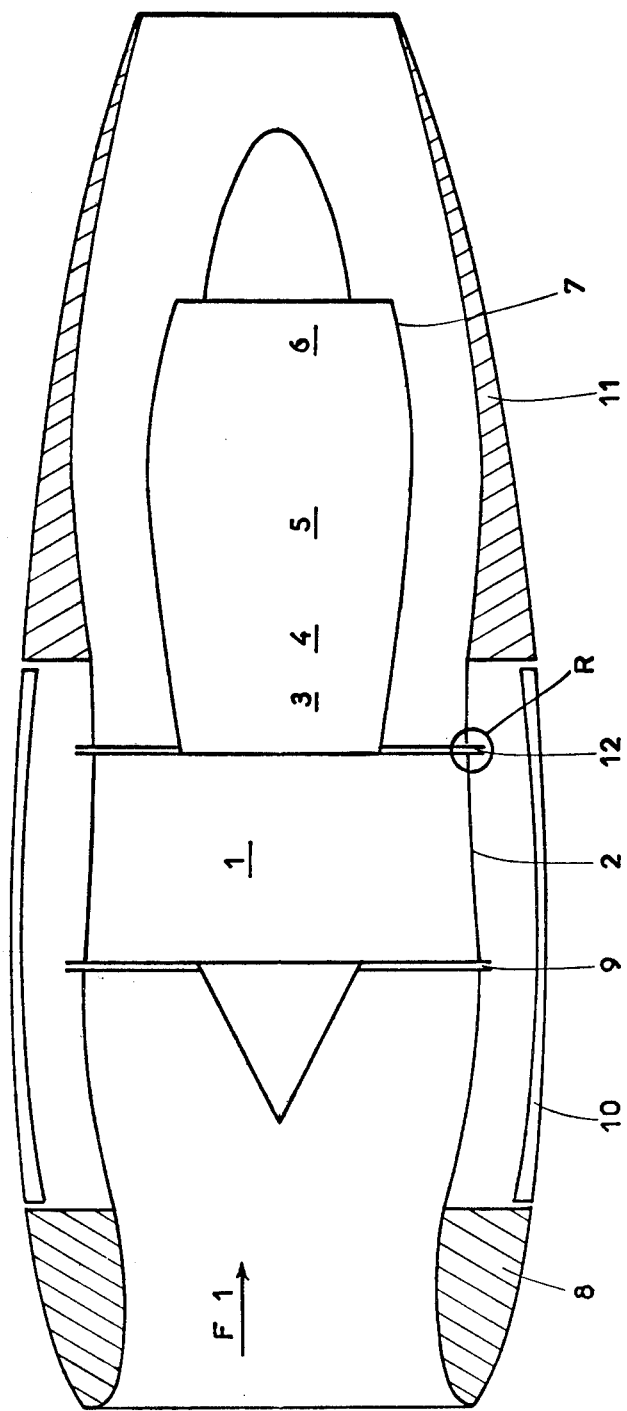
Figure 5:
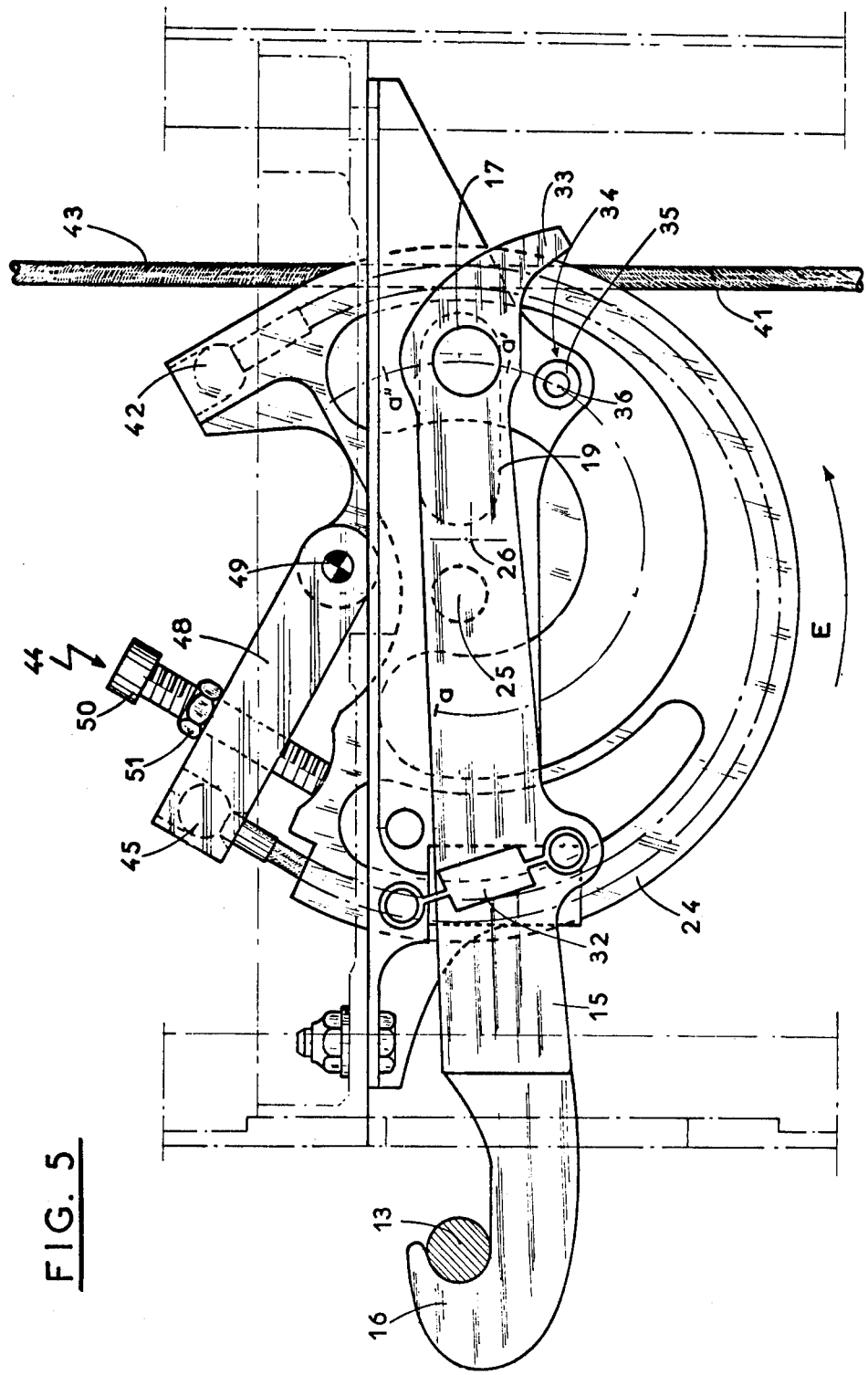
FIG. 5 is a cross section of the lockbolt along line A—A of FIG. 4.

FIGS. 4 and 5 correspond to a greatly enlarged detail view of the region R of FIG. 1, showing a preferred embodiment of the lockbolt and its constituent parts. The position of the lockbolts on the periphery of the cowlings is such that the shaft 25 and the working portion of the strap 13 of a given lockbolt both lie along a radial plane of their corresponding cowling. There are some differences between FIGS. 4 and 5, on the one hand, and FIGS. 2 and 3, on the other hand. Nevertheless, similar components bear the same reference numbers. The support 20 is made integral with a flange of the cowling 11. The strap 13 is made integral, by means of its support 14, with a flange of the fan housing 2. Means for centering and holding the two components stationary in the transverse direction are provided, the centering and holding means comprising an annular groove 28 on the housing 2 and an annular projection 29 on the cowling 11. A number of identical lockbolts are distributed at regular intervals along the periphery of the two components to be integrally joined with each other.

The tie bar 15 comprises a bifurcated piece straddling the support 20, which support has a "U" shape in cross section.

The moving part 24 is in this case a truncated pulley with a shaft 25 (FIG. 5) and two grooves 30, 31 onto which are wound the drive means, which here consist of cables. The cam profile has a first circular portion centered on 26, whose centerline is the circular arc aa', and a second circular portion centered on 25, which acts as a dwell section extending along an arc a'a".

The tie bar take-up means comprise a spring 32, here working in tension, connected at one end to the tie bar 15 and at the other to the support 20. This spring tends to constantly draw the tie bar 15 toward a thrust block (not shown) consisting of a roller integral with the support 20.

The operation, which is identical to that of FIGS. 2 and 3, will not be described. It differs in FIGS. 4 and 5 only in the means for disengaging the hook 16 at the fully extended end of its path. Such means in this case comprise a spur 33 which acts together with a thrust bearing 34 of the support 20. The thrust bearing 34 is provided with a roller 35 (FIG. 5) whose shaft 36 is mounted on the outside of each arm of the "U" which forms the support 20.

When the tie bar 15 is made to move leftwards as the cam turns in the direction shown by arrow E in FIG. 5, the spur 33 gradually comes into contact with the roller 35, causing the rod to rotate around shaft 17 against the force exerted by the spring 32.

The strap 13 has a support 14 secured to the flange of the housing 2. This strap may be adjusted in the direction of X'X by means of a nut 37. This arrangement makes it possible to independently regulate the tension of each lockbolt with a tensioning wrench as needed after the hooks are tightly engaged.

In the case where the invention is used to join together cowlings, a certain number of lockbolts as described above are required, spaced at regular intervals. They are then operated synchronously. An example of a control system to achieve this end will be described below with reference to FIGS. 4, 5 and 6. The drive means consist of a shaft 38 parallel to the axis of the cowlings and having a square section 39, such as for engaging a wrench. The rotation shaft 25 of the moving part 24 of each lockbolt lies in a radial direction. The shaft 38 bears a first pulley 40 to which is fastened a first cable 41, which cable is affixed at its other end 42 (FIG. 5) to the moving part 24 to, in turn, drive the tie bar 15 of one of the lockbolts, and which cable winds within a groove 30 in the moving part. A second cable 43 is connected at 45 to the pulley 24 by an adjusting means 44. It is wound in the second groove 31 of the pulley 24 and is connected to the control pulley of the next succeeding moving part, and so on. The moving part 24 of the last lockbolt of the series has a point of attachment for a return cable 46 which returns to a second pulley 47 fixed on the shaft 38. Each moving part 24 which controls a tie bar 15 comprises at least one tension adjustment means for one of the cables. The same may be the case for pulleys 40 and 47. The tension adjusting means 44 is comprised of a lever 48 which pivots on a shaft 49 of the moving part 24. The angular position of lever 48 can be adjusted by means of a screw 50 whose rotation is blocked by a locknut 51. The lever 48 is held in position by the force exerted by the cable 43 which is held fast at 45 in the lever 48. Cable guiding means (not shown), particularly for the return cable 46, are provided in order, first, to prevent the cables from rubbing against the walls of the cowlings, and, second, to ensure their proper engagement in the grooves of the control pulleys 24.

The functioning of the control system is explained with reference to FIG. 6.

In this figure, the tie bar 15 is depicted in its fully retracted position. Turning the shaft toward the unlocking position causes the entire set of moving parts 24 to rotate in the direction indicated by arrow E by means of the cable 46, the motion being transmitted between the various moving parts by connecting cables such as 43.

Depending on requirements, the lockbolts may be organized in two series. This will be the case, for example, if it is necessary to provide a break in the cowling in order to allow passage of an engine suspension means. Such a configuration is depicted in FIG. 6, where two sets of lockbolts lying to either side of the control means 39 are shown.

The advantage of providing a dwell portion in the cam profile becomes immediately evident in the case of control by cables, where dimensional variations may arise after a certain number of operations, leading to an angular displacement of the moving parts with respect to each other. In this case, the moving parts can continue to move even if some of the hooks are already in their fully retracted position, so as to enable the hooks to come into position even if they have a given lag due to the angular displacement of their controlling moving parts. When they are first assembled, the moving parts 24 of all the lockbolts are positioned in such a fashion that, in the fully retracted position, the rollers 18 of all the tie bars will lie in the dwell section a'a", preferably toward the middle of this section.

Although the invention has been described in connection with a specific application of fastening a rear nacelle cowling onto the fan housing of a turbojet by-pass engine, the invention is evidently applicable to all cases where cowlings are to be joined together, particularly the joining of a nacelle component to the housing of a turbojet engine of the known type that does not include a fan.

What is claimed is:

1. Device for attaching a first component to a second component, the device comprising:

means for holding the second component against the first component and ensuring the transmission of longitudinal stresses between the first and second components, said means comprising a plurality of spaced lockbolts, and means for synchronously controlling said lockbolts, each lockbolt comprising:

a strap associated with said first component;

a driven tie bar associated with said second component;

a hook on one end of said tie bar, said hook cooperating with said strap;

a pivot shaft at the other end of said tie bar;

a slide track fixed with respect to said second component, said pivot shaft cooperating with said slide track for translational movement therealong;

means coupled with said tie bar for driving the same;

said driving means including a moving part with an axis which is fixed with respect to said second component, said driving means being actuated by said controlling means;

said moving part including a cam which cooperates with said pivot shaft of said tie bar, said cam having a first section of evolutional radius with respect to the axis of the moving part and a second section which transitions from the end of the largest radius of said first section and has constant radius with respect to the axis of the moving part.

means for disengaging said hook from said strap by pivoting said tie bar from its direction of translation at its fully extended position, and take-up and holding means between said second component and said tie bar for restraining said tie bar to translational movement except when pivoted by said disengaging means.

2. Attachment device according to claim 1, wherein said first section of said cam of the moving part is circular and off-centered with respect to said fixed axis of the moving part.

3. Attachment device according to claim 1 wherein the disengaging means includes a thrust block on said moving part, whereby rotation of said moving part causes said thrust block to come into contact with said tie bar in such a fashion as to turn said tie bar aside from its direction of translation at the terminal portion of its stroke.

4. Attachment device according to claim 1 wherein said disengaging means includes a spur located on said tie bar at the end opposite the hook, and a thrust block fixed with respect to said second component, said tie bar cooperating with said thrust block, whereby said tie bar acts as a lever whose axis is said pivot shaft of said tie bar.

5. Attachment device according to claim 1 wherein said take-up and holding means comprise a spring connected by one of its ends to said tie rod and by the other end to a point of attachment fixed with respect to said second component, and of a thrust block which cooperates with said tie bar.

6. Attachment device according to claim 1, wherein the cooperation between the said pivot shaft of the tie bar and said slide track, as well as the cooperation between said pivot shaft of said tie bar and said cam are effected by rollers.

7. Attachment device according to claim 1 wherein said means for synchronously controlling said lockbolts includes a rotary member, a first cable attached at one end to said rotary member and attached at the other end to said moving part of one lockbolt, a second cable attached to said moving part and linked to the moving part of an adjacent lockbolt, adjusting means coupled between said one end of said first cable and said part, on the one hand, and coupled between said second cable and said moving part of said one lockbolt, on the other hand, and a last cable returning to said rotary member at a point other than the point of attachment of the first cable, and means for guiding the cables on the periphery of said second component.

8. Aircraft turbine engine of the type comprising, in the upstream to downstream direction of flow of air, at least one compressor, one combustion chamber, one or more turbine stages and an exhaust pipe contained within a housing, the housing having a flange, the said turbine engine being contained within a nacelle comprising a forward portion forming an air intake, a middle portion and a sliding, annular rear portion, wherein the sliding rear portion of the nacelle is made integral with the flange of the housing of the turbine engine by means of a device comprising:

means for centering and angularly positioning the rear portion with respect to the flange;

means for absorbing stresses acting in the direction of the joining plane of the flange and the rear portion;

means for holding the rear portion tight against the flange and ensuring the transmission of longitudinal stresses between the flange and the rear portion, said holding means comprising a plurality of circumferentially spaced lockbolts, and means for synchronously controlling said lockbolts, each lockbolt comprising:

a first stationary support on the flange;
a strap mounted on said stationary support;
a second support attached to said rear portion;
a hook on one end of said tie bar, said hook cooperating with said strap;
a pivot shaft at the other end of said tie bar;
a slide track in said second support, said pivot shaft cooperating with said slide track for translational movement therealong;
means coupled with said tie bar for driving the same;
said driving means including a moving part having an axis defined by a fixed shaft, said fixed shaft being parallel to said pivot shaft, said driving means being actuated by said controlling means;
said moving part including a cam which cooperates with said pivot shaft of said tie bar, said cam having a first section of evolutional radius with respect to the axis of the moving part and a second section which transitions from the end of the largest radius of said first section and has constant radius with respect to the axis of the moving part;

means for disengaging said hook from said strap by pivoting said tie bar from its direction of translation as its fully extended position, and biasing means between said rear portion and said tie bar for restraining said tie bar to translational movement except in response to said disengaging means.

9. Aircraft bypass turbine engine of the type which comprises, in the upstream to downstream direction of the flow of air, a fan turning within a first housing, at least one compressor, a combustion chamber, these latter components being placed within a second housing connected with the first, the said turbine engine being enclosed in a nacelle comprising a forward portion forming an air intake, a middle portion and a sliding, annular rear portion which channels the air exiting from the fan, the first housing having a flange located downstream thereof and fixed with respect thereto, the sliding, annular rear portion of the nacelle being made integral with a flange located downstream of the fan housing by a device comprising:

means for centering and angularly positioning the rear portion with respect to the flange;

means for absorbing stresses acting in the direction of the joining plane of the flange and the rear portion;

means for holding the rear portion tight against the flange and ensuring the transmission of longitudinal stresses between the flange and the rear portion, said holding means comprising a plurality of circumferentially spaced lockbolts, and means for synchronously controlling said lockbolts, each lockbolt comprising:

first stationary support on the flange;
a strap mounted on said first support;
a second support attached to the rear portion;
a hook on one end of said tie bar, said hook cooperating with said strap;
a pivot shaft at the other end of said tie bar;
a slide track in said second support, said pivot shaft cooperating with said slide track for translational movement therealong;
means coupled with said tie bar for driving the same;
said driving means including a moving part having an axis defined by a fixed shaft, said fixed shaft being parallel to said pivot shaft, said driving means being actuated by said controlling means;
said moving part including a cam which cooperates with said pivot shaft of said tie bar, said cam having a first section of evolutional radius with respect to the axis of the moving part and a second section which transitions from the end of the largest radius of said first section and has constant radius with respect to the axis of the moving part;

means for disengaging said hook from said strap by pivoting said tie bar from its direction of translation at its fully extended position; and take-up and holding means between said rear portion and said tie bar for restraining said tie bar to translational movement except when pivoted by said disengaging means.

10. Device for attaching a sliding cowling of a turbine engine nacelle onto a flange of the housing of the turbine engine, comprising:

means for centering and angularly positioning the cowling with respect to the flange;

means for absorbing stresses acting in the direction of the joining plane of the flange and the cowling;

means for holding the cowling tight against the flange and ensuring the transmission of longitudinal stresses between the flange and the cowling, said holding means comprising a plurality of circumferentially spaced lockbolts, and means for synchronously controlling said lockbolts, each lockbolt comprising:
 a first support on the flange;
 a strap mounted on said first support;
 a second support attached to said cowling;
 a driven tie bar;
 a hook on one end of said tie bar, said hook cooperating with said strap;
 a pivot shaft at the other end of said tie bar;
 a slide track in said second support, said pivot shaft cooperating with said slide track for translational movement therealong;
 means coupled with said tie bar for driving the same;
 said driving means including a moving part having an axis defined by a fixed shaft, said fixed shaft being parallel to said pivot shaft, said driving means being actuated by said controlling means;
 said moving part including a cam which cooperates with said pivot shaft of said tie bar, said cam having a first section of evolutional radius with respect to the axis of the moving part and a second section which transitions from the end of the largest radius of the preceding section and has constant radius with respect to the axis of the moving part;

means for disengaging said hook from said strap by pivoting said tie bar from its direction of translation at its fully extended position; and take-up and holding means between said cowling and said tie bar for restraining said tie bar to translational movement except when pivoted by said disengaging means.

* * * * *